W. U. FAIRBAIRN.

Copying-Press.

No. 6,365. Reissued April 6, 1875

Wm U. Fairbairn Inventor,
by his atty
Thos. Wm. Clarke

Geo. S. Prindle.
John R. Young } Witnesses.

BEST AVAILABLE COPY
BEST AVAILABLE COPY

UNITED STATES PATENT OFFICE.

WILLIAM U. FAIRBAIRN, OF BOSTON, MASSACHUSETTS, ASSIGNOR TO HIMSELF, W. S. CHAMBERLIN, AND C. E. RANDALL.

IMPROVEMENT IN COPYING-PRESSES.

Specification forming part of Letters Patent No. 146,519, dated January 20, 1874; reissue No. 6,365, dated April 6, 1875; application filed December 11, 1874.

*To all whom it may concern:*

Be it known that I, WILLIAM U. FAIRBAIRN, of Boston, in the county of Suffolk and State of Massachusetts, have invented a new and useful Hydrostatic Press, specially designed to be used for a copying-press, but useful for other purposes; and I do hereby declare the same to be fully described in the following specification, and represented in the accompanying drawing, in which—

Figure 1:
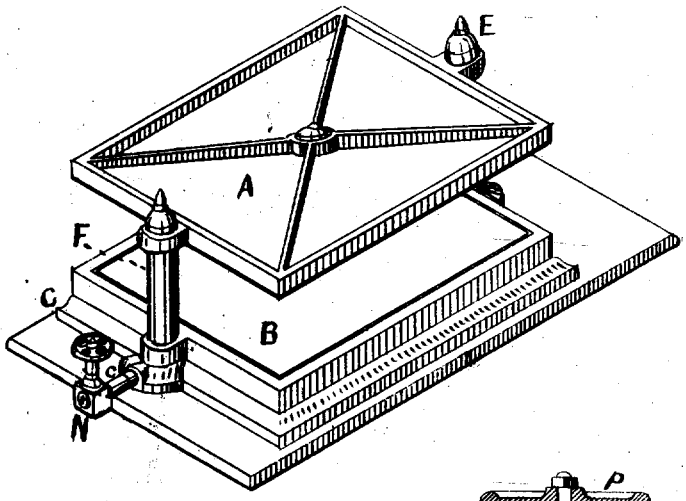
Figure 2:
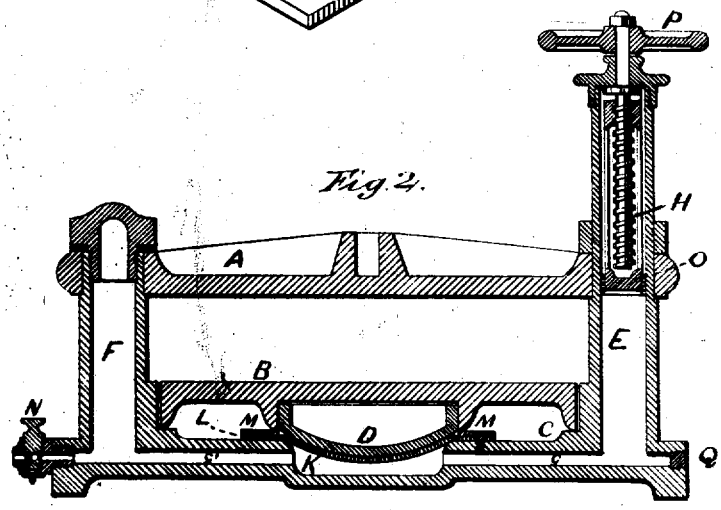

Figure 2 is a vertical section of the press; and Fig. 1 is a perspective of the press arranged without the pump, to be operated solely by pressure of water from a reservoir or street-main.

Light presses, such as are in general use for copying, are operated mostly by a combination of lever and screw, and require considerable effort of the operator at the final compression—so much that not only the parts of the apparatus require considerable weight, but the stand or table has to be of great strength, in order to resist effectually the strain to which it is subjected. To avoid this overstraining, make a press which is light, cheap, easily manipulated, and less liable to injure the stand, and thus make it more convenient, is the object of this invention, and I accomplish it by applying hydrostatic pressure, either by a pump or, when practicable, by use of water from a reservoir or street-main when the head is sufficient.

The invention consists in the combination, with the movable plate of a press, of a flexible diaphragm, which forms the top of an enlarged chamber connected, by a water-way, either with a force-pump or a column of water under pressure; also, in combining said flexible diaphragm, movable plate, and water-way with a cock to let off the water or other fluid from the cavity or chamber beneath the diaphragm and passage connected therewith; also, in combining, with said flexible diaphragm, movable plate, and water-way, a cock capable of alternately connecting the cavity or water-chamber of the press with a supply of water under pressure, and of closing such communication and opening a discharge-outlet from said water-chamber, so that it may be emptied.

In the drawings, C is the base of the press, a rectangular frame surrounding the basin K. This basin is connected, by water-ways or pipes G G′, with the exterior of the frame. Standards F E unite the base of the press C with the top or fixed plate A, which is firmly held to them by collars, as shown. These standards are preferably made tubular, and their cavity connected with the water-way. When the press is to be operated by a pump, one of these standards E forms the pump-barrel, in which a piston, O, is moved by means of the screw H and hand-wheel P.

In working with the pump the external openings of the water-ways G G′ are to be closed, and this may be done by a plug, as shown at Q, or by a cock, as shown at N.

Upon the lower side of the movable plate B is an inverted dome, D, which descends or dips into the basin K when the plate B is down. Over the top of the basin K is arranged a flexible water-tight diaphragm of good "plain packing"—that is, vulcanized rubber, with cloth insertion, or other suitable material.

This must be somewhat sack-shaped, as shown, so as to expand upward when filled with water. A ring or clamping plate, M, set round the edge of the basin K over the diaphragm, and fastened to the edge or border of the basin by screws, as shown, securely fastens the diaphragm L as a cover to basin K, and makes a water-tight joint. A cock, N, is attached to one end of the press, with its inner end in communication with the basin K, and is so constructed as to be capable of alternately admitting to said basin a supply of water under pressure, and of permitting the same to escape therefrom.

When the force-pump is to be used, raise the piston and fill the passages, basin, and standards with liquid through the cock N; then shut said cock N, so that water cannot escape. The book or other thing to be pressed is put between the plates, and the piston moved down by the screw H working in the nut at the upper part of the piston, and the liquid is thus forced against the diaphragm L, which latter, with the dome D and plate B, move toward plate A, and exert the required pressure.

By reversing the action of the screw the pressure is released, and the press made ready for another operation.

If water under pressure from a main or reservoir is used as the source of power, the operator only needs to move the cock N, the same being properly connected with the water-supply, as before described.

I claim and desire to secure by Letters Patent—

1. In a hydrostatic press, the basin K, flexible diaphragm L, and movable plate B, in combination with each other, and with a force-pump, E, or flow of water under pressure, substantially as described.

2. In a hydrostatic press, the combination of the flexible diaphragm L, water-way G, and pump E O, substantially as described.

3. In a hydrostatic press, the combination of flexible diaphragm L, water-way G′, and cock N, communicating with a source of water-supply under pressure, substantially as described.

4. In a hydrostatic press, the combination of flexible diaphragm L, water-ways G G′, pump E O, and cock N, substantially as described.

5. In a hydrostatic press, the combination of flexible diaphragm L, basin K, and inverted dome D, substantially as described.

6. In a hydrostatic press, the combination of piston O, screw H, and hollow standard E, substantially as described.

7. In a hydrostatic press, the combination of the base C, movable plate B, and diaphragm L, substantially as shown and described.

WM. U. FAIRBAIRN.

Witnesses:

THOS. WM. CLARKE,
A. L. POWELL.